United States Patent
Hughes

(10) Patent No.: US 8,316,258 B2
(45) Date of Patent: Nov. 20, 2012

(54) SYSTEM AND METHOD FOR ERROR DETECTION IN A DATA STORAGE SYSTEM

(75) Inventor: James P. Hughes, Palo Alto, CA (US)

(73) Assignee: Oracle America, Inc., Redwood City, CA (US)

( * ) Notice: Subject to any disclaimer, the term of this patent is extended or adjusted under 35 U.S.C. 154(b) by 1426 days.

(21) Appl. No.: 11/743,811

(22) Filed: May 3, 2007

(65) Prior Publication Data

US 2008/0276152 A1 Nov. 6, 2008

(51) Int. Cl.
G06F 11/00 (2006.01)

(52) U.S. Cl. .............................. 714/6.24; 714/54; 714/2

(58) Field of Classification Search .................... 714/54, 714/770, 6.2
See application file for complete search history.

(56) References Cited

U.S. PATENT DOCUMENTS

| | | | |
|---|---|---|---|
| 4,295,218 A * | 10/1981 | Tanner | 714/762 |
| 5,390,327 A | 2/1995 | Lubbers et al. | |
| 5,522,032 A * | 5/1996 | Franaszek et al. | 714/6.24 |
| 6,163,870 A | 12/2000 | Luby et al. | |
| 6,629,198 B2 | 9/2003 | Howard et al. | |
| 6,633,856 B2 | 10/2003 | Richardson et al. | |
| 7,065,680 B2 * | 6/2006 | Mantyla | 714/49 |
| 7,210,004 B2 * | 4/2007 | Guha et al. | 711/114 |
| 7,293,284 B1 * | 11/2007 | Bartram et al. | 726/10 |
| 7,370,243 B1 * | 5/2008 | Grohoski et al. | 714/48 |
| 7,380,060 B2 * | 5/2008 | Guha et al. | 711/114 |
| 2002/0034269 A1 | 3/2002 | Demjanenko et al. | |
| 2003/0204717 A1 | 10/2003 | Kuehnel | |
| 2005/0243610 A1 * | 11/2005 | Guha et al. | 365/189.05 |
| 2005/0283660 A1 * | 12/2005 | McKeen et al. | 714/11 |
| 2006/0004942 A1 * | 1/2006 | Hetherington et al. | 711/3 |
| 2006/0069966 A1 * | 3/2006 | Liu | 714/718 |
| 2007/0079017 A1 * | 4/2007 | Brink et al. | 710/22 |
| 2007/0157070 A1 * | 7/2007 | Wenger et al. | 714/807 |
| 2007/0174668 A1 * | 7/2007 | Srinivasan | 714/6 |
| 2007/0260815 A1 * | 11/2007 | Guha et al. | 711/114 |
| 2009/0238052 A1 * | 9/2009 | Ko | 369/47.14 |
| 2010/0031000 A1 * | 2/2010 | Flynn et al. | 711/216 |
| 2010/0205509 A1 * | 8/2010 | Kirschner et al. | 714/773 |

* cited by examiner

*Primary Examiner* — Kamini Patel

(74) *Attorney, Agent, or Firm* — Brooks Kushman P.C.

(57) ABSTRACT

A system and method for error detection in a data storage array includes one or more storage medium interconnected with a controller through a network. A data integrity engine in the controller applies a first error detection process to a data object to create one or more data blocks and associated parity codes. First and second error detection processes are applied to detect and repair errors in the data object.

20 Claims, 3 Drawing Sheets

SYSTEM AND METHOD FOR ERROR DETECTION IN A DATA STORAGE SYSTEM

BACKGROUND OF THE INVENTION

1. Field of the Invention

The present invention relates to a system and a method for error detection in a data storage system.

2. Background Art

Conventional data storage systems are typically implemented to provide network-oriented environments as scalable and network-aware file systems that can satisfy both data storage requirements of individual systems and the data sharing requirements of workgroups and clusters of cooperative systems. The data storage array includes a collection of storage elements or medium and a controller that controls the operation of the storage elements and presents them as a single storage unit to a host computer.

The data storage array can include a variety of configurations, including a redundant array of independent disks (RAID) or tapes (RAIT). In a RAID array, data consistency and redundancy is assured using parity data. A limitation with current data storage arrays is rereading the data blocks prior to the bad data block for reconstructing the bad data block is that this operation is time consuming. This level of redundancy places additional and unnecessary burdens on system resources.

SUMMARY OF THE INVENTION

A system and method for error detection in a data storage array includes one or more storage medium interconnected with a controller through a network. A data integrity engine in the controller applies a first error detection process to a data object to create one or more data blocks and associated parity codes. First and second error detection processes are applied to detect and repair errors in the data object.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
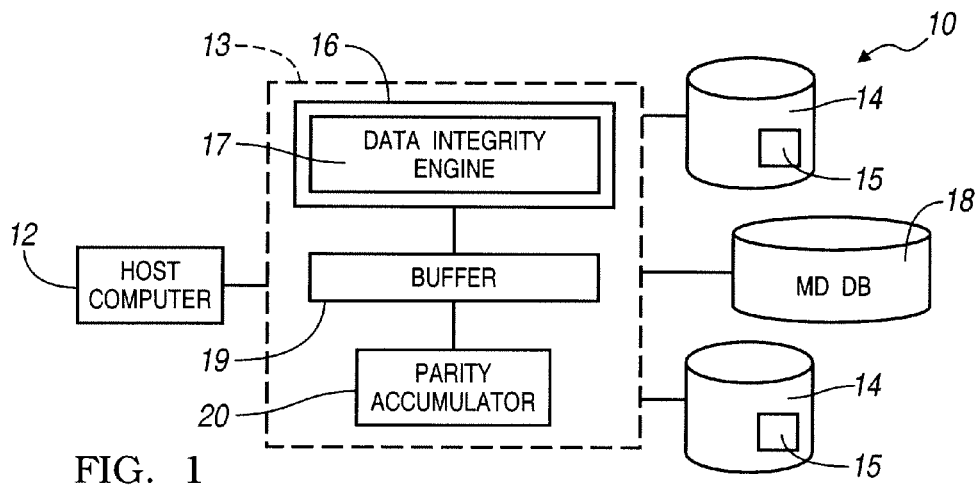
FIG. 1 illustrates a block diagram of a data storage system.

Referring now to the Figures, a system and method for error correction in a data storage system includes a data storage array system 10 having a user computer 12 connected to one or more storage mediums or nodes 14 through a network 13. As illustrated in FIG. 1, the one or more storage nodes are separate and distinct storage medium. It is understood that a single storage medium can be used with data storage system 10.

Storage medium 14 may be disk drives, tape drives, and the like managed by a server 15. Data storage system 10 is typically a collection of storage elements that are accessible by a user computer as a single storage unit. As discussed above, the individual storage elements can be any type, or a combination of types, of storage devices such as, hard disk drives, semiconductor memory, optical disks, magnetic tape drives, and the like. The user computer typically executes an operating system and application programs utilizing data from the storage medium 14.

The data storage system 10 may include a redundant array of independent disks (RAID) or tapes (RAIT). RAID comes in various operating levels which range from RAID level 0 (RAID-0) to RAID level 6 (RAID-6). Additionally, there are multiple combinations of the various RAID levels that form hybrid RAID levels such as RAID-5+, RAID-6+, RAID-10, RAID-53 and so on. Each RAID level represents a different form of data management and data storage within the RAID disk array.

In a RAID array, data consistency and redundancy is assured using parity data. Specifically, a RAID array contains N−1 data storage elements and a parity storage element. Each data stripe contains N−1 data blocks and one parity block. N−1 data blocks are striped to respective N−1 data storage elements and a parity block is striped to the parity storage element. The process then continues for the next data stripe.

As will be discussed below, RAID parity is generated using an exclusive OR (XOR) function. In general, parity data is generated by taking an XOR function of the data blocks within a given data stripe. Using the parity information, the contents of any block on any single one of the storage elements in the array can be regenerated from the contents of the corresponding blocks on the remaining storage elements in the array. Consequently, if the XOR of all corresponding blocks in the data stripe, except one is computed, the result is the remaining block. Thus, if data storage element one in the storage element array should fail, for example, the data block it contains can still be delivered to applications by reading corresponding blocks (data and parity) from all the surviving storage elements and computing the XOR of their contents. The RAID array includes fault tolerances such that the loss of one storage element in the array does not impact data availability.

Storage medium 14 communicate with a controller 16 through a network. Controller 16 may be operable to serially write data blocks and parity blocks from user computer 12 onto storage medium 14. Controller 16 may also be operable to sequentially read data blocks and parity blocks from storage medium 14 for user computer 12.

Controller 16 may include a data integrity engine 17 and a meta data database 18 in connection with engine 17. Engine 17 of controller evaluates the integrity of data to be stored and retrieved from storage medium 14 using one or more error correction detection methods. Controller cooperates with a buffer 19 and a parity accumulator 20. Parity accumulator 20 accumulates parity as the data integrity engine 17 of controller 16 sequentially writes the data blocks from user computer 12 to the storage medium 14 through buffer 19. This process will be described in greater detail below.

Figure 2:
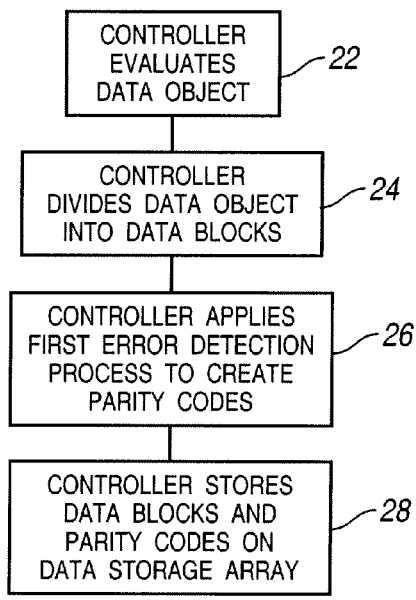
FIG. 2 illustrates a flow chart showing a process for writing data objects to a data storage system using a first error detection method.

FIG. 2 illustrates a method of writing a sequence of data blocks to a storage medium using a first error detection method. At step 22, one or more data objects is received and evaluated by the data integrity engine of the controller. At step 24, the controller divides the data objects into discrete segments or blocks. A data block may be a portion of data that is being processed all at once. In one aspect contemplated for use with the system and method, the controller evaluates the data object and divides the object into discrete 512 byte blocks to be written to the medium. It is understood that the size of the segments may be adjusted based on any number of criteria.

At step 26, the controller runs a hash function on each of the data blocks to create a parity code associated with each data block. The hash function converts an input from the data block into an output in a smaller set, commonly referred to as a hash value. Various hash processes differ in the domain of the respective input streams of the data blocks and the set of the respective output streams and in how patterns and similarities of input streams generate the respective output streams. Examples of hash generation algorithms include a Secure Hashing Algorithm-1 (SHA-1) and/or a Message Digest 5 (MD5) algorithm. However, the hash function may be generated using any appropriate algorithm to meet the design criteria of a particular application. At step 28, the sequence of parity codes and respective hash functions are stored as metadata associated with the data blocks and are stored on the storage medium.

Figure 3:
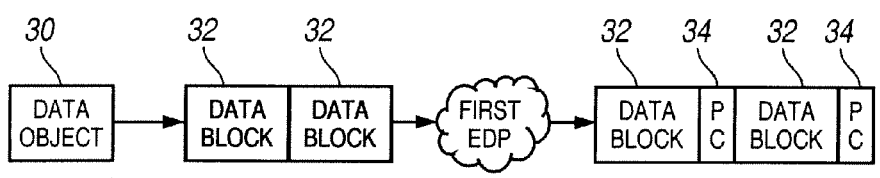
FIG. 3 illustrates an example of applying a hash function to the data objects utilizing the first error detection method.

FIG. 3 illustrates this process in greater detail. A data object 30 is evaluated by the data integrity engine of the controller. The engine applies the hash function to segment the data object 30 into a discrete sized data block 32 and creates an associated parity code 34. The controller may additionally run a hash function on each of the data blocks to create a hash object that is associated with the data block and stored in the metadata on the storage medium.

Controller 16 sequentially writes all of the data blocks in a data stripe to the storage medium 14, while writing the parity blocks from parity accumulator 20 either concurrently or consecutively to the data blocks to the storage medium 14 and/or meta data database 18. Parity accumulator 20 then reinitializes and starts accumulating parity again for the next data stripe to be written to the one or more storage medium 14. This continues until controller 16 has written all of the data blocks to the storage medium 14.

During normal reading operation, the controller 16 sequentially passes the data blocks to the user computer from the storage medium 14 and discards the parity blocks. If a read error occurs such that a data block is unreadable, the controller 16 returns to the storage medium 14 having the first data block in the data stripe and then sequentially rereads the data blocks prior to the bad data block. The controller 16 accumulates parity for the reread data blocks. The controller 16 then skips the bad data block and continues sequentially reading the remaining data blocks and the parity block in the data stripe. The controller 16 applies the first error detection method to reconstruct the bad data block from one or more of three factors. These factors are the parity of the data blocks prior to the bad data block, the data blocks after the bad data block, and the parity block.

In a data storage system or array, the controller accumulates parity codes as the data blocks are sequentially written from the user computer to the one or more storage medium. When all of the data blocks in a data stripe have been written to respective data storage medium, the controller writes the block of accumulated parity codes to the parity portion of the storage medium. The controller then reinitializes and starts accumulating parity again for the next data stripe to be written to the storage medium. These steps continue until all of the data blocks have been written to the storage medium.

Figure 4:
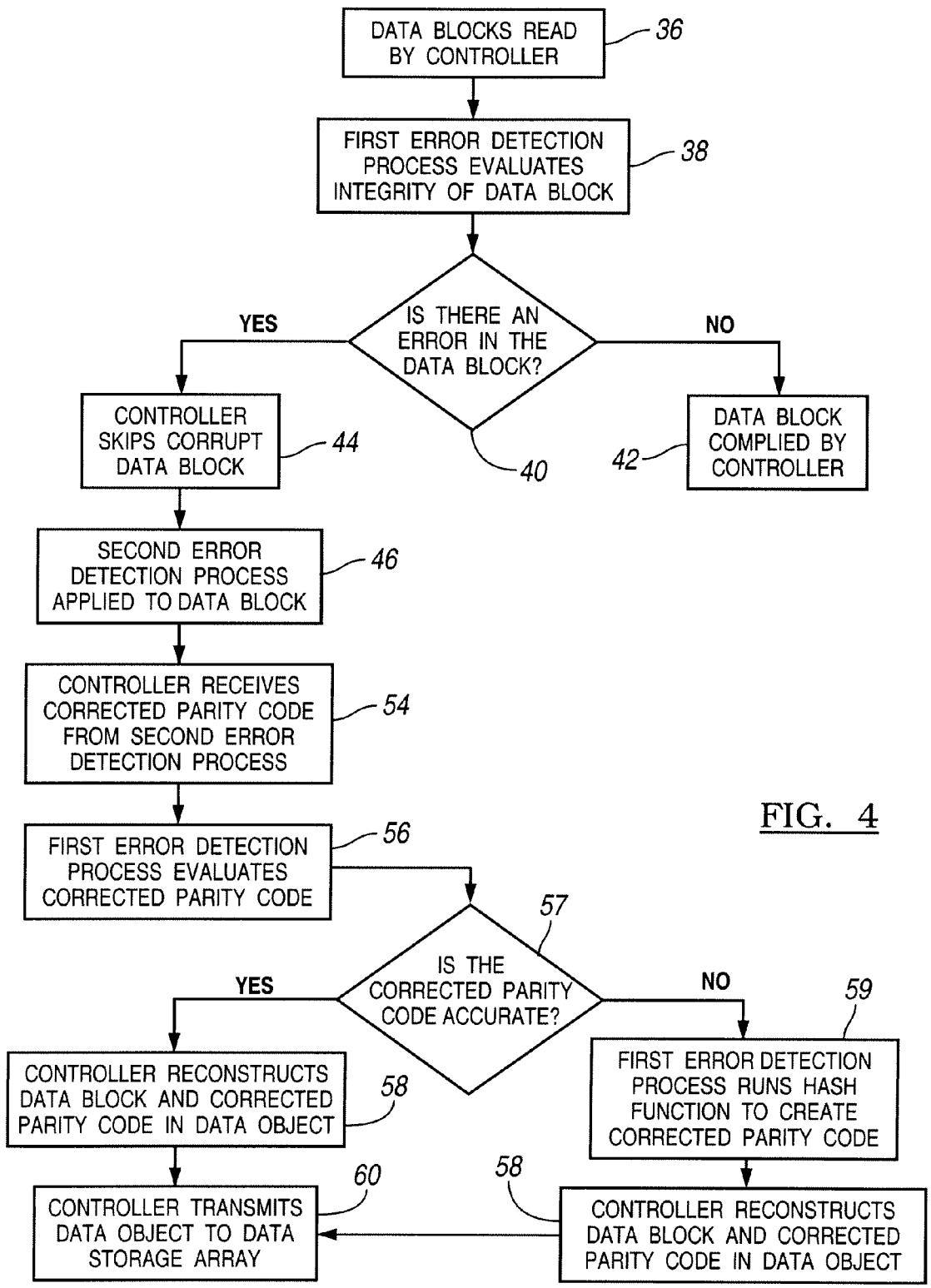
FIG. 4 illustrates a flow chart showing operation of the method of detecting a corrupt data block utilizing first and second error detection methods.

FIG. 4 illustrates a flow chart illustrating operation a method of detecting an error condition on the data storage array. The process may begin with the data integrity engine of the controller reading the data blocks sequentially from the one or more storage medium as shown in step 36. At step 38, the engine evaluates the data blocks and determines if any of the data blocks contain errors or corrupted information as the data blocks are being read and compiled by the controller.

As shown in step 40, the data integrity engine determines whether one or more of the data blocks being compiled is unreadable or contains errors. If not, the data blocks are compiled and transmitted to the user computer at step 42. If an error is detected, the controller skips the bad data block and continues sequentially reading the remaining data blocks and the parity block in the data stripe at step 44. Alternatively, the controller may stop to address the error condition detected in the data block.

Figure 5:
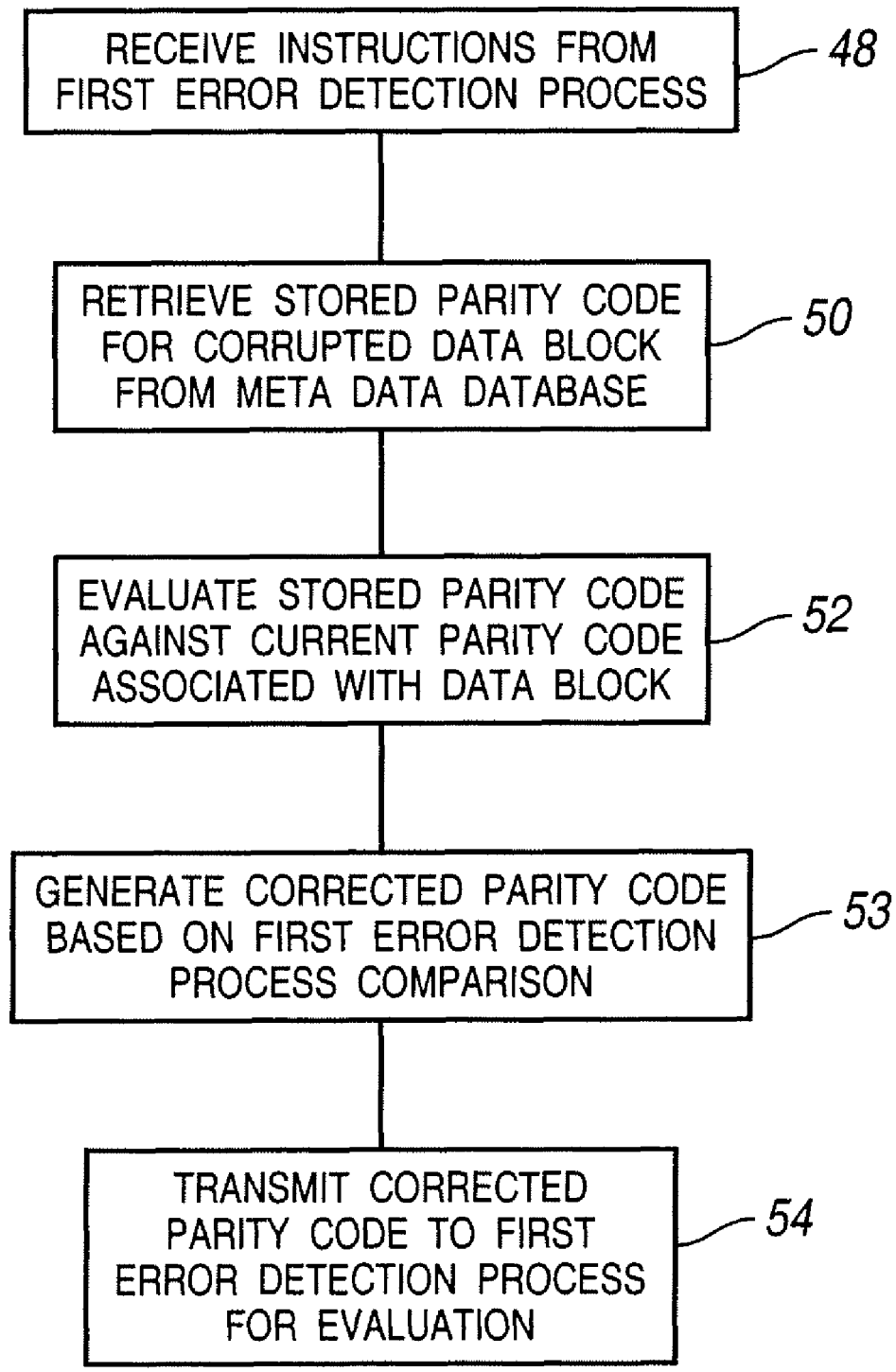
FIG. 5 illustrates a flow chart showing a method of evaluating a corrupt data block in the data storage system utilizing a second error detection method.

Once completed, the data integrity engine of the controller evaluates the bad data block using an error detection method as shown in step 46. FIG. 5 illustrates the second error detection method in greater detail. Second error detection process is activated by instructions received from the first error detection process. Second error detection method may include one or more of the following steps. It is also understood that the order in which the steps are taken may be interchangeable.

In a first step referenced by number 50, the accumulated parity code stored for the corrupted data block is retrieved from the meta data database and/or the one or more storage medium. At step 52, the data integrity engine of controller evaluates the accumulated parity code previously written and stored in meta data for the corrupted data block against the current parity code for corrupted data block. Based on this evaluation, the controller generates a corrected parity code to associate with the data block as shown in step 53.

At step 54, the controller transmits the corrected parity code generated by the second error detection method to the first error detection method for evaluation. At steps 56 and 57, if the first error detection method determines that the corrected parity code is accurate, the first error detection method applies the corrected parity code to the data block. If the corrected parity code is not accurate, the first error detection method either applies a hash function to generate the corrected parity code or applies a parity code generated by the hash function of the first error correction method at the time the data object is processed by the data integrity engine when created on the storage medium at step 59.

As described above, the hash function may be applied using a variety of algorithms and methods. In one exemplary algorithm, the first error detection method evaluates a sequence of recalculated hashes and the sequence of original hashes are compared to detect any errors in the sequence of data blocks. Each recalculated hash in the sequence of recalculated hashes corresponds to a data block in the sequence of data blocks. A particular recalculated hash corresponding to a particular data block is determined as a function of the particular data block and at least one previous recalculated hash corresponding to a previous data block in the sequence of data blocks.

A particular hash corresponding to a particular data block may be determined as a function of the particular data block and an immediately previous hash corresponding to an immediately previous data block in the sequence of data blocks. Alternatively, the particular hash would be determined as a function of the particular data block and any one or more previous hashes corresponding to the previous data blocks in the sequence of data blocks.

At step 58, the controller reconstructs the corrupted data object using the data block and the corrected parity code transmitted from the data integrity engine using the first error correction method. At step 60, the controller recompiles the reconstructed data block into the data stripe between the previously accepted data blocks and transmits the data object to the user computer for access.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for error detection in a data object on a data storage array, the system comprising:
   one or more storage medium;
   a controller in communication with the one or more storage medium for analyzing and storing data on the one or more storage medium;
   a first error detection process for evaluating the data object and creating one or more data blocks and associated parity codes;
   a second error detection process for evaluating corruptions in the data object and creating a corrected parity code when the first error detection process locates a corruption in the data block,
   wherein the first error detection process corrects the corruption based on evaluation of the corrected parity code generated by the second error detection process and parity codes stored on the medium for the associated data block.

2. The system of claim 1 wherein the first error detection process further comprises:
   conducting a hash function on the data object using an algorithm to convert the data object into one or more data blocks and associated parity codes,
   storing the one or more data blocks and parity codes on the storage array,
   evaluating the one or more data blocks to detect an error in the data block,
   recompiling the data block with a corrected parity code, and
   transmitting the recompiled data object to the data storage array.

3. The system of claim 2 wherein the first error detection process stores the parity codes associated with the one or more data blocks in a meta data database.

4. The system of claim 2 wherein the hash function algorithm comprises a Secure Hashing Algorithm-1.

5. The system of claim 2 wherein the hash function algorithm comprises a Message Digest 5 algorithm.

6. The system of claim 2 wherein the first error detection processes converts the data object into one or more data blocks each of 512 bytes.

7. The system of claim 1 wherein the second error detection process further comprises:
   receiving instructions from the first error detection process to evaluate a corruption in the data block,
   evaluating the parity code associated with the corrupted data block against a previously stored parity code for the data block,
   generating a corrected parity code for the data block based on comparison of the stored parity code and the parity code for the corrupted data block, and
   transmitting the corrected parity code to the first error detection process for evaluation.

8. The system of claim 7 wherein the first error detection process analyzes and applies the corrected parity code generated by the second error detection process if the corrected parity code matches the parity code initially created for the data block by the first error detection process.

9. The system of claim 7 wherein the first error detection process analyzes the corrected parity code generated by the second error detection process and conducts a hash function to generate a corrected parity code if the corrected parity code generated from the second error detection process does not match the stored parity code for the data block.

10. A method of error detection in a data object on a data storage array, the method comprising:
    interconnecting one or more storage medium and a controller through a network;
    applying a first error detection process to the data object to create one or more data blocks and associated parity codes for storage on the one or more storage medium;
    detecting a corrupt data block with the first error detection process; and
    applying a second error detection process for evaluating corruptions in the data object and creating a corrected parity code when the first error detection process locates a corruption in the data block,
    wherein the first error detection process corrects the corruption based on evaluation of the corrected parity code generated by the second error detection process and parity codes stored on the medium for the associated data block.

11. The method of claim 10 wherein the step of conducting a first error detection process further comprises:
    conducting a hash function on the data object using an algorithm to convert the data object into one or more data blocks and associated parity codes,
    storing the one or more data blocks and parity codes on the storage array,
    evaluating the one or more data blocks to detect an error in the data block,
    recompiling the data block with a corrected parity code, and
    transmitting the recompiled data object to the data storage array.

12. The method of claim 11 further comprising the step of storing the parity codes associated with the one or more data blocks generated by the first error correction process in a meta data database.

13. The method of claim 11 wherein the step of conducting a hash function on the data object includes applying a Secure Hashing Algorithm-1.

14. The method of claim 11 wherein the step of conducting a hash function on the data object includes applying a Message Digest 5 algorithm.

15. The method of claim 10 wherein the second error detection process further comprises:
    receiving instructions from the first error detection process to evaluate a corruption in the data block,
    evaluating the parity code associated with the corrupted data block against a previously stored parity code for the data block,
    generating a corrected parity code for the data block based on comparison of the stored parity code and the parity code for the corrupted data block, and
    transmitting the corrected parity code to the first error detection process for evaluation.

16. The method of claim 15 wherein the first error detection process analyzes and applies the corrected parity code generated by the second error detection process if the corrected parity code matches the parity code initially created for the data block by the first error detection process.

17. The method of claim 15 wherein the first error detection process analyzes the corrected parity code generated by the second error detection process and conducts a hash function to generate a corrected parity code if the corrected parity code generated from the second error detection process does not match the stored parity code for the data block.

18. A method of error detection in a data storage array having one or more storage medium in communication with a controller, the method comprising:

applying a first error detection process to a data object with a has function algorithm to create one or more data blocks and associated parity codes for storage on the one or more storage medium;

evaluating the one or more data blocks to detect a corrupted data block with the first error detection method;

evaluating the parity code associated with the corrupted data block with the second error correction process against a previously stored parity code for the data block when instructed by the first error detection process;

generating a corrected parity code for the data block for transmission to the first error detection process based on the comparison of the stored parity code and corrupted parity code;

recompiling the data block with the corrected parity code with the first error detection process; and transmitting the recompiled data object to the data storage array.

19. The method of claim 18 wherein the first error detection process analyzes and applies the corrected parity code generated by the second error detection process if the corrected parity code matches the parity code initially created for the data block by the first error detection process.

20. The method of claim 18 wherein the first error detection process analyzes the corrected parity code generated by the second error detection process and conducts a hash function to generate a corrected parity code if the corrected parity code generated from the second error detection process does not match the stored parity code for the data block.

* * * * *

UNITED STATES PATENT AND TRADEMARK OFFICE
CERTIFICATE OF CORRECTION

| | | |
|---|---|---|
| PATENT NO. | : 8,316,258 B2 | |
| APPLICATION NO. | : 11/743811 | |
| DATED | : November 20, 2012 | |
| INVENTOR(S) | : James P. Hughes | |

It is certified that error appears in the above-identified patent and that said Letters Patent is hereby corrected as shown below:

Column 7, Line 11, Claim 18:

After "a data object with a"
Delete "has"

Signed and Sealed this
Twelfth Day of March, 2013

Teresa Stanek Rea
*Acting Director of the United States Patent and Trademark Office*